Figure 1:
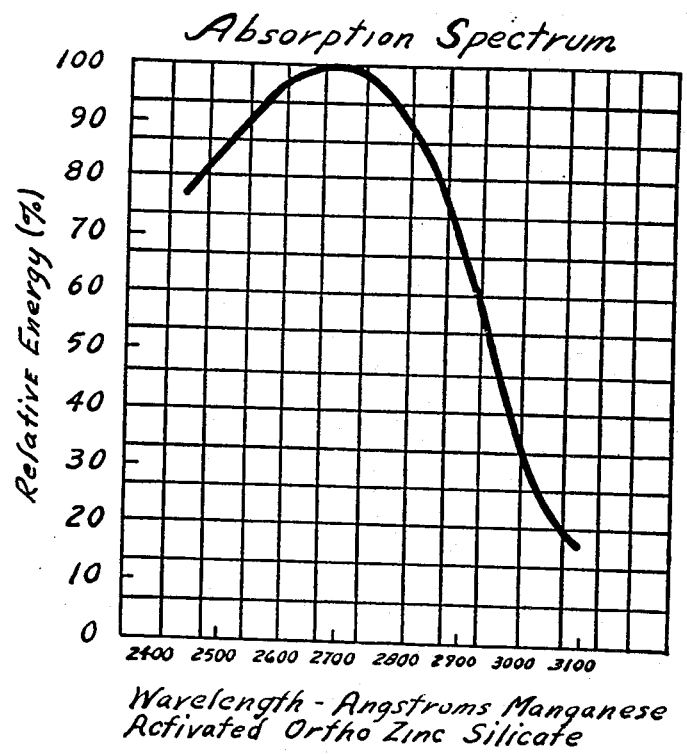

United States Patent [19]
deMarco et al.

[11] Patent Number: 4,481,422
[45] Date of Patent: Nov. 6, 1984

[54] INTRUSION DETECTING CAMOUFLAGE FLUORESCENT COATING

[75] Inventors: Arthur P. deMarco, Aberdeen; Gerald E. Cook, Bel Air, both of Md.

[73] Assignee: The United States of America as represented by the Secretary of the Army, Washington, D.C.

[21] Appl. No.: 145,958

[22] Filed: May 21, 1971
(Under 37 CFR 1.47)

Related U.S. Application Data

[62] Division of Ser. No. 832,870, Jun. 12, 1969, abandoned.

[51] Int. Cl.³ ............................................ G01N 21/64
[52] U.S. Cl. .................................. 250/459.1; 89/1 A; 250/461.1; 252/301.36
[58] Field of Search ................. 252/301.2 R, 301.3 R, 252/301.36; 260/33.66 A; 117/1; 250/83.3 H, 459.1, 461.1; 89/1 A

[56] References Cited

U.S. PATENT DOCUMENTS

| | | | |
|---|---|---|---|
| 2,841,562 | 7/1958 | Bergin | 252/301.36 |
| 2,905,572 | 9/1959 | Jones | 427/73 X |
| 3,448,268 | 6/1969 | Proctor | 250/353 |
| 3,535,265 | 10/1970 | Baron et al. | 252/301.35 |
| 3,631,434 | 12/1971 | Schwartz | 250/208 X |

Primary Examiner—Leland A. Sebastian
Attorney, Agent, or Firm—Robert P. Gibson; Anthony T. Lane; Muzio B. Roberto

[57] ABSTRACT

A camouflage luminescent composition comprising by weight: 52 to 54% of a phosphor, 1 to 3% of a pyrogenic colloidal silica; 0 to 3% of a raw umber colorant; 8 to 15% of an organic resin binder; 23 to 46% of a aromatic hydrocarbon solvent, and a method of use thereof.

6 Claims, 2 Drawing Figures

Emission Spectrum

Wavelength Angstroms Manganese Activated Ortho Zinc Silicate

INTRUSION DETECTING CAMOUFLAGE FLUORESCENT COATING

The invention described herein may be manufactured, used, and licensed by or for the Government for governmental purposes without the payment to us of any royalty thereon.

This is a division of Ser. No. 832,870, filed June 12, 1969, now abandoned.

The present invention relates to a fluorescent composition, and more particularly to a composition which is sprayed over a terrain to form a camouflaged coating. A light source is then utilized to scrutinize the coated terrain to detect any obvious disturbances therein.

During hostilities, it is a common practice of the enemy to set up an ambush in order to inflict damage to unsuspecting troops, equipment or materials. Various means may be utilized in the ambush which involves some disturbance to the terrain, e.g., the implantation of an explosive charge in a railroad bed.

In general, this invention involves the spray application of a fluorescent coating, which has been colored to blend with the color of a given terrain, e.g., railway roadbed ballast. The invention utilizes manganese activated ortho zinc silicate phosphor pigments having luminescent characteristic of the fluorescent type dispersed in a thermoplastic organic resin solution, e.g., of the acrylate or polyisobutylene type. Fluorescent phosphor pigments of this type absorb strongly under excitation with short wave, i.e., 2537 angstroms, ultraviolet radiation and emit strongly in the visible spectrum with peak luminosity, nominally at 5200 angstroms.

Figure 2:
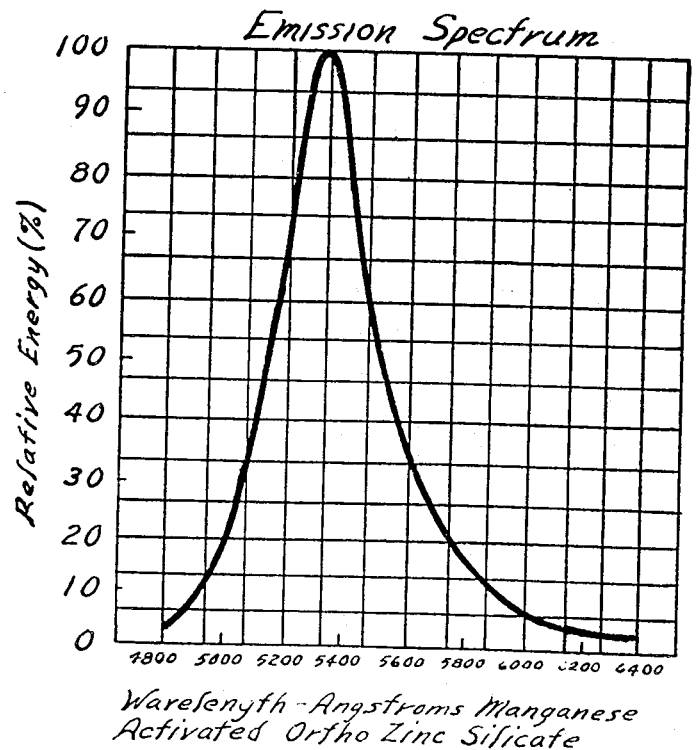

The absorption and emission spectral characteristics of the present fluorescent phosphor pigments are indicated graphically in FIGS. 1 and 2 of the drawings. Since ultraviolet radiation of wave lengths required for excitation of the fluorescent phosphors is non-existent in natural or artificial daylight, coatings containing such phosphors can be colored to blend with existing terrain so that the coatings are not discernible in the daylight.

Applications of the composition to a terrain, e.g., a railway bed, is made by means of a self-contained railway operated spraying device. A self-contained light source is then utilized to scrutinize the treated roadbed to disclose and mark any obvious disturbances in the coated terrain.

It is an object of this invention to provide and disclose a novel fluorescent composition.

It is a further object of this invention to provide and disclose a fluorescent coating which is colored to blend with a given terrain.

It is a further object of this invention to provide and disclose a method for the detection of an ambush which involves the utilization of a light source to detect any disturbance of the terrain.

Other object and a fuller understanding of the invention may be ascertained from the following description and claims.

Processing or manufacture of the present composition is accomplished in conventional paint manufacturing mills of the closed type, such as "Pebble" mills or high speed "Dissolvers". The organic resin solution and about ⅔ of the required solvent are added. This is followed by the addition of the phosphor pigment, anti-settling agent, i.e., colloidal silica, and about ⅔ of the colorant. The feed hatch is then secured and the mill is operated until the specified degree of pigment dispersion, i.e., between 2 to 3 Hegman Gage Units, is obtained. The Hegman Dispersion Gage utilizes a numerical scale sequentially from 0 to 8, wherein 0 signifies very course and 8 very fine dispersions. At various intervals during milling, small samples are withdrawn to determine both degree of dispersion and resultant color, at which time additional colorant may be added, if required, until the desired color of the composition and dispersion have been obtained. Another alternative is to mill the colorant separately in a smaller mill and then add the dispersed colorant to the main batch in amounts required to attain the desired color. Once color and dispersion of the composition has been obtained, the batch is emptied into a mixing tank. The mill is rinsed with the remaining ⅓ solvent called for by the composition and the rinse is emptied for incorporation into the batch in the mixing tank.

Set forth in Table 1 below are several specific examples of the formulation of the present composition:

TABLE 1

| Ingredients | Formulations (% parts by weight) | | | | | | |
|---|---|---|---|---|---|---|---|
| | 1 | 2 | 3 | 4 | 5 | 6 | 7 |
| manganese activated ortho zinc silicate | 53.65 | 52.67 | 52.67 | 52.67 | 52.67 | 52.67 | 52.67 |
| pyrogenic colloidal silica | 1.49 | 1.46 | 1.46 | 1.46 | 1.46 | 1.46 | 1.46 |
| raw umber colorant | — | 1.46 | 2.63 | 2.93 | 2.63 | 2.63 | 2.63 |
| acrylate resin | 8.59 | 8.43 | 8.43 | 8.43 | 10.81 | 12.00 | 14.40 |
| toluol | 12.88 | 12.64 | 12.64 | 12.64 | 16.22 | 18.01 | 21.60 |
| xylol | 23.40 | 23.34 | 22.17 | 21.87 | 16.21 | 13.23 | 11.33 |

The pyrogenic colloidal silica utilized is a submicroscopic particulate grade of 99.9 pure silica having a particulate size range of 0.015 to 0.020 microns and is prepared by the vapor phase hydrolysis of a silicon compound in a hot gaseous environment at elevated temperatures of 1100° C. The colloidal silica serves as an effective anti-settling agent which prevents adverse settling of the high density phosphor pigments from the coating during storage and in the container during spray application.

The selected colorant is a commercially blended domestic raw umber of the easy dispersing type containing approximately 46.5% iron oxide and conforms to Type 1 of Federal Specification TT-P-455, meeting National Bureau of Standard Color No. 304.

In the examples of Table 1 above, the acrylate resin binder is a thermoplastic copolymerized resin of methyl methacrylate. Other acrylate resins may be utilized. The present binder has effective film forming characteristics related to good adhesion, flexibility and weatherability. In this respect, the acrylate resins are superior to the thermoplastic resins of the polyisobutylene type. However both the acrylate and polyisobutylene resin binders are desirable because they are relatively transparent, i.e., non-absorbent, to the short wave ultraviolet radiation required for the excitation of the fluorescent phosphor pigment.

The volatile solvents, i.e., toluol and xylol, have a high degree of solvency and compatibility for the selected acrylate resin and impart excellent spraying properties to the composition.

Set forth in Table II below are the percent diffuse reflectance and the fluorescence intensity of the formulations of Table 1 above. The measurements of the fluorescence intensity were made on specimens 1-square foot in area by spray application of the coatings on lightly oiled manila paperboard having 3.9 grams of dry coating per square foot. The measurements of the diffuse reflectance were made on Color-Eye Signature Model 1-D1 on the same specimens used for fluorescence measurement.

TABLE II

| Formulations | 1 | 2 | 3 | 4 | 5 | 6 | 7 |
|---|---|---|---|---|---|---|---|
| % diffuse reflectance | 89.7 | 38.3 | 28.1 | 25.6 | 26.3 | 24.8 | 21.3 |
| fluorescence intensity, photo cell resistance Ohms | 180 | 220 | 280 | 300 | 290 | 310 | 360 |

Experimentation was conducted to determine the effect of the dispersion of the phosphor pigments in the organic resin on the fluorescent intensity. Samples of fine intermediate, coarse (and an equal weight mixture thereof) particulate texture of phosphor were utilized. It was found that a 2-3 Hegman Gage Unit dispersion gave the lowest fluorescence intensity, as set forth in Table III below.

TABLE III

| Phosphor Particulate Texture | Milling Time, Hours | Dispersion Hegman Gage Units | Fluorescene Intensity Ohms Photo Cell Resistance |
|---|---|---|---|
| Fine | 3 | 2-3 | 180 |
| | 24 | 5-6 | 220 |
| | 72 | 7-8 | 260 |
| Intermediate | 3 | 2-3 | 175 |
| | 24 | 5-6 | 225 |
| | 72 | 7-8 | 270 |
| Coarse | 3 | 2-3 | 180 |
| | 24 | 5-6 | 210 |
| | 72 | 7-8 | 250 |
| Mixture | 3 | 2-3 | 185 |
| | 24 | 5-6 | 220 |
| | 72 | 7-8 | 260 |

Experimentation was also conducted to determine the minimum amount of coating necessary to give the required intensity. It was found that a coating of 0.49 to 3.90 grams of dry coating per square foot was sufficient as set forth in Table IV below:

TABLE IV

| Grams | Spraying Speed Miles Per Hour | Diffuse Reflectance | Fluorescence Intensity Ohms Photo Cell Resistance |
|---|---|---|---|
| 3.90 | 5 | 28.0 | 280 |
| 1.95 | 10 | 30.4 | 280 |
| 0.98 | 20 | 32.0 | 310 |
| 0.49 | 40 | 32.2 | 350 |

In a specific operation the detector assembly is mounted on a self-propelled radio controlled vehicle operated a safe distance ahead of a target troop and/or cargo train. The assembly houses multiple mercury vapor lamps which provide a short wave, i.e., 2537 angstroms, non-visible ultraviolet radiation to excite the coated terrain immediately under the hooded lamp assembly. Under excitation, the coated terrain emits a certain amount of visual radiation, mostly in the green region of the spectrum between 5100 and 5500 angstroms, the intensity of which is measured by means of a photo conductive cell in terms of unit Ohms cell resistance.

The greater the intensity of the coated terrain, the lower the cell resistance will be, and conversely. In the absence of the phosphor coating, very little radiation is emitted and the cell will register a cell resistance as high as 5000 Ohms, whereas in the presence of a phosphor coating, the cell resistance will be approximately 300 Ohms depending on the thickness of the coating. Thus, any disturbances in the coated terrain, which are of a size indicative of a potential ambush involving an implanted explosive charge will disturb the continuity of the area and yield a high photo cell resistance which energizes an electrical warning signal.

The photo conductive cell is of a cadmium sulphide type designed specifically for this application and may be likened to a light meter used in photography for measuring the intensity of available light for photographic purposes. While similar in principle, it differs mostly in that the cell is designed to be the most sensitive to the types of available visual radiation emitted by the phosphor coating, i.e., between 5100 to 5500 angstroms.

In design, the multiple photo cells are mounted behind optical lenses in tubular holders housed in the detector system in such a fashion as to view a circular area of coated or disturbed terrain, nominally 26±3 cm in diameter.

Although, we have described our invention with a certain degree of particularity, it is understood that the present disclosure has been made only by way of example and that numerous changes in composition and use will occur to a person skilled in the art without departing from the spirit and scope of the invention as hereinafter claimed.

Having described our invention, we claim:

1. A method of detecting an ambush comprising the spraying of a composition consisting of:

| Ingredients | % by Weight |
|---|---|
| manganese activated ortho zinc silicate | 52 to 54 |
| pyrogenic colloidal silica | 1 to 3 |
| raw umber colorant | 0 to 3 |
| organic resin binder | 8 to 15 |
| hydrocarbon solvent | 33 to 46 | over a terrain in an amount of 0.49 to 3.90 grams of dry coating per square foot of terrain and subsequently subjecting the coated terrain to a detector light comprising multiple mercury vapor lamps which provide a short wave, non-visible ultraviolet radiation to excite the coated terrain, whereby the coated terrain emits a certain amount of visual radiation which is measured, to determine whether there has been any disturbance of the terrain.

2. A method in accordance with claim 1 wherein the resin binder is selected from the group consisting of methyl methacrylate and polyisobutylene.

3. A method in accordance with claim 2 wherein the hydrocarbon solvent is selected from the group consisting of toluol and xylol.

4. A method in accordance with claim 3 wherein the coated terrain is a railway bed.

5. A method in accordance with claim 1 wherein the raw umber colorant is 1.46% by weight.

6. A method in accordance with claim 1 wherein the raw umber colorant is 2.93% by weight.

* * * * *